United States Patent [19]

Henderson et al.

[11] Patent Number: 5,477,208
[45] Date of Patent: * Dec. 19, 1995

[54] MOTORCYCLE SIGNALLER

[76] Inventors: Steven Henderson, 4071 Madison Ave.,, Montreal, Quebec, Canada, H4B 2T8; David Kernaghan, 2360 Beaconsfield, Montreal, Quebec, Canada, H4A 2G8

[*] Notice: The portion of the term of this patent subsequent to Nov. 23, 2010, has been disclaimed.

[21] Appl. No.: 274,344

[22] Filed: Jul. 13, 1994

Related U.S. Application Data

[63] Continuation-in-part of Ser. No. 219,292, Mar. 28, 1994, which is a continuation-in-part of Ser. No. 863,686, Apr. 1, 1992, Pat. No. 5,264,826.

[51] Int. Cl.$^6$ .................................................. B60Q 1/52
[52] U.S. Cl. .................... 340/471; 340/331; 340/326; 340/474; 340/475; 340/427; 340/432; 315/200 A
[58] Field of Search .................. 340/471, 474, 340/475, 469, 427, 432, 331, 326; 362/19, 80, 248, 276, 359

[56] References Cited

U.S. PATENT DOCUMENTS 4,286,308  8/1981  Wolff ........................................ 362/19

Primary Examiner—John K. Peng
Assistant Examiner—Daryl C. Pope
Attorney, Agent, or Firm—Stephen J. Perry; Sim & McBurney

[57] ABSTRACT

An emergency flasher circuit for use with motor vehicles comprising an emergency switch, a signal generator for generating a signal having a frequency of approximately 10 Hz, and logic circuitry for selectively applying the signal to the headlight(s), and/or to one or both of the left and right turn indicator lights, for alerting other drivers to the presence of the motor vehicle. Alternatively, an optical shutter may be connected to the logic circuitry, and the headlight(s) or one or both of the left and right turn indicator lights for causing light generated by the headlight(s) and/or the turn indicator lights to flash at approximately 10 Hz upon activation of the horn switch, for alerting other drivers to the presence of the motor vehicle.

6 Claims, 13 Drawing Sheets

MOTORCYCLE SIGNALLER

CROSS REFERENCE TO RELATED APPLICATIONS

This is a continuation-in-part of U.S. application Ser. No. 08/219,292 filed Mar. 28, 1994, which is a continuation-in-part of PCT international application number PCT/CA93/00137 filed Mar. 31, 1993 designating the United States, which is a continuation-in-part of U.S. application Ser. No. 07/863,686 filed Apr. 1, 1992, now issued to U.S. Pat. No. 5,264,826 dated Nov. 23, 1993.

FIELD OF THE INVENTION

This invention relates in general to signalling systems, and more particularly to an emergency flasher circuit for use with motorcycles and automobiles.

BACKGROUND OF THE INVENTION

Each year in North America, many thousands of motorcyclists die in collisions with automobiles and trucks. In many of these accidents, the driver of the automobile or truck claims not to have seen the motorcycle. Because motorcycles subtend a much smaller angle of the visual field than do cars (particularly in front view), a motorcycle whose image falls on the peripheral retina of an automobile or truck driver may not generate sufficient motion induced activity in retinal neurons to render the motorcycle salient to the car or truck driver.

A number of prior art devices are known for heightening the awareness of automobile and truck drivers to the presence of motorcycles. For example, U.S. Pat. No. 4,241,328 (Lobe et al) teaches a circuit arrangement for the turn indicator blinker lights of motorcycles. When the motorcycle is moving (i.e. not in neutral and with the clutch engaged) and one of the turn indicators is activated, a buzzer is activated to provide a combined audible and visible signal. When the clutch is disengaged or the transmission is in neutral, then the buzzer or horn is left inactivated when the turn signal is activated.

U.S. Pat. No. 4,812,808 (Ulrich) discloses a lighting system for motorcycles with minimal wiring cables and harnesses.

U.S. Pat. Nos. 3,916,377 (Demeter) and 4,051,361 (Lichon et al) disclose prior art signal devices for use with motorcycles to identify the presence of a motorcycle. Each of these patents discloses a flasher mounted to the top of a mast at the rear of the motorcycle. The '361 Patent specifies that left and right turn indication is possible.

U.S. Pat. No. 4,127,844 (Purdy) discloses a high intensity electronic flasher warning system which operates in the range of 60 to 100 flashes per minute (i.e. 1 to 1 ⅔ Hz). The flasher is activated by either the brake, turn or emergency flash circuits of the motorcycle.

U.S. Pat. No. 4,550,305 (Bookbinder) also discloses a pulsating lighting system for motorcycles in which a first strobe is associated with the headlamp and a second strobe is associated with operation of the tail light. The strobes are indicated as operating in the range of 1 to 2 Hz.

Another prior art visual warning system is available for bicycles and is manufactured under the trade name "Vistalite" by Vistalite Inc. of Lancaster,. Pa., U.S.A. The "Vistalite" system generates a flicker frequency between 4 Hz and 6 Hz.

Although the above discussed prior art warning systems are known to improve driver awareness to the presence of motorcycles and bicycles, none of the prior art systems maximize the visual salience of images falling on the retinal periphery (i.e. so as to call the driver's attention to objects and hazards that are not being directly looked at).

SUMMARY OF THE INVENTION

Vision researchers have found that the human eye is maximally sensitive to light modulated at 10 Hz. For example, Bartley (1939, 1951) shows that the brightness enhancement effect is maximal at a flash frequency of approximately 10 Hz, which is the alpha rhythm of the occipital cortex (the principal visual processing region of the brain). Bartley further reports that maximum brightness enhancement occurs when the light-to-dark ratio is 1:1 (i.e. a 50% duty cycle). Furthermore, Harris, Calbert, and Snelgar (1990), and Hess and Pointer (1989), show that 10 Hz is in fact the flicker frequency at which temporal contrast sensitivity is maximized. (Contrast sensitivity is a measure of maximum detection distance, as detection distance is directly proportional to the square root of the temporal contrast sensitivity for any flicker frequency.) Harris et al tested temporal contrast sensitivity at 12 degrees of retinal eccentricity, and Hess and Pointer tested at 0, 5, 10, 20, 40, and 60 degrees of retinal eccentricity. Harris et al also found that the number of temporal cycles before flicker adaptation (disappearance) reaches a maximum at 10 Hz.

According to the present invention, emergency flasher circuits are provided for alerting automobile and truck drivers to the presence of a motorcycle by flashing the motorcycle headlight(s) and/or signal lights at a rate of 10 Hz, thereby increasing the visual salience of the motorcycle image which falls on the retinal periphery of the automobile or truck driver so that visual attention will be drawn to the object at that location. More specifically, a saccade is induced in the driver's eye, causing the location of the flickering light to move to the centre of the retina (i.e. the gaze of the automobile or truck driver is caused to shift to the motorcycle), thereby increasing the driver's awareness of a developing dangerous situation.

According to the preferred embodiment of the invention, the turn indicator lights are caused to flicker at approximately 10 Hz when the horn button is depressed, and when the horn button is depressed simultaneously with one of the turn indicator switches, then the selected turn indicator light is caused to flash in 2 Hz bursts of 10 Hz flicker.

According to a first alternative embodiment of the invention, depressing the horn button causes the turn indicator lights to flicker at approximately 10 Hz only if neither turn indicator switch is closed. When the horn switch is closed simultaneously with one of the turn indicator switches, the turn signalling function has priority, causing the selected turn indicator light to flash at 2 Hz, the other side remaining unlit.

According to a second alternative embodiment of the present invention, during daylight hours the headlight may be caused to flicker upon activating the horn button. An incorporated photocell prevents headlight flicker at night.

According to a third alternative embodiment of the invention, the photocell of the third alternative embodiment may be replaced by an ON/OFF toggle switch.

According to a fourth alternative embodiment a light shutter is placed over the headlight and/or the turn signal lights as an alternative to directly flashing of the lights.

BRIEF INTRODUCTION TO THE DRAWINGS

Detailed descriptions of the preferred and alternate embodiments are provided below in connection with the following drawings, in which:

FIG. 1 is a plan view of a motorcycle equipped with headlight and turn indicators;

FIGS. 2A and 2B form a schematic diagram of an emergency light flasher circuit in accordance with the preferred embodiment;

FIGS. 3A and 3B form a schematic diagram of an emergency light flasher circuit in accordance with a first alternative embodiment;

FIGS. 4A and 4B form a schematic diagram of an emergency light flasher circuit in accordance with a second alternative embodiment;

FIGS. 5 and 4B form a schematic diagram of an emergency light flasher circuit in accordance with a third alternative embodiment;

FIGS. 6A and 6B form a schematic diagram of a shutter drive circuit according to a fourth alternative embodiment of the invention;

DETAILED DESCRIPTION OF PREFERRED AND ALTERNATE EMBODIMENTS

Figure 1:
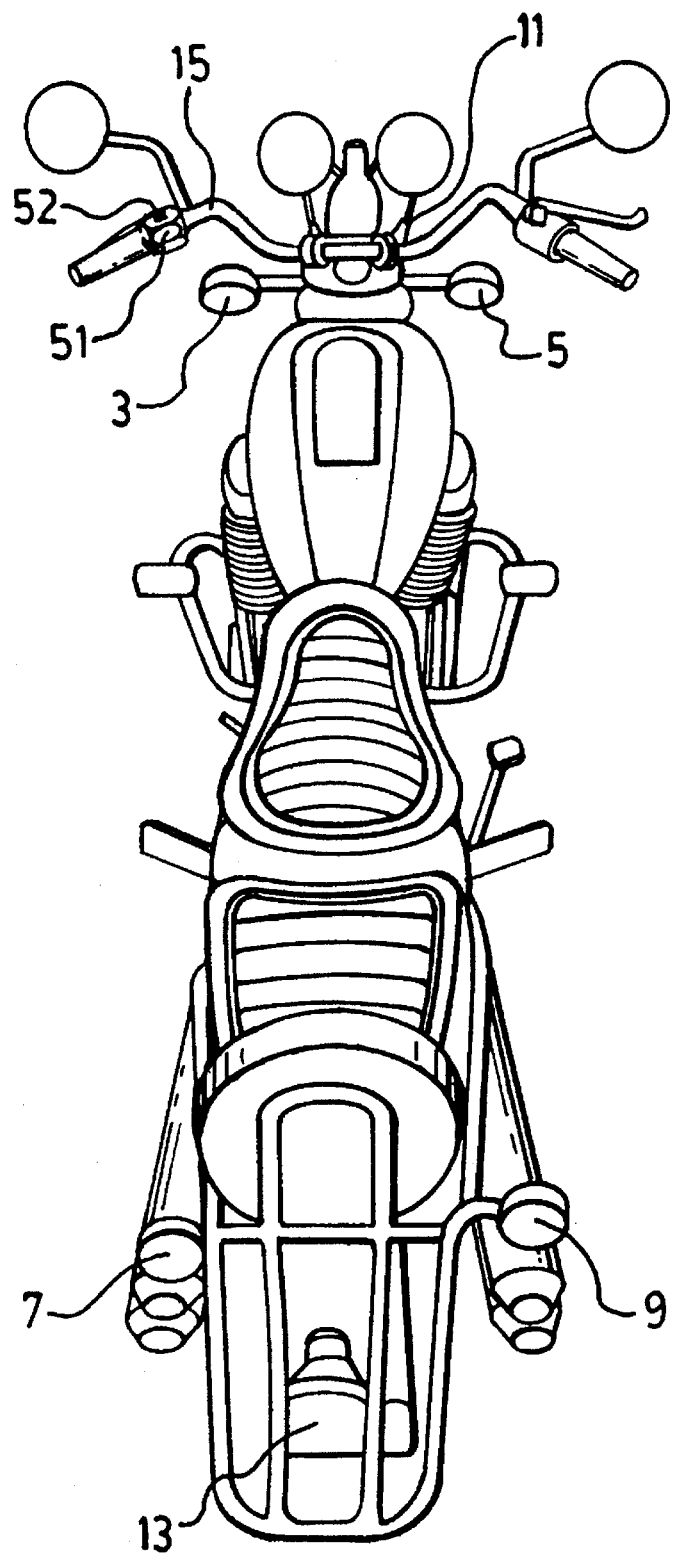

Turning to FIG. 1, a standard model motorcycle, such as a 1979 Honda CB 750K, is shown comprising front left and right turn indicators 3 and 5, respectively, rear left and right turn indicators 7 and 9, respectively, a headlight 11 and a taillight 13. Located on the handlebar 15 of the motorcycle are a horn activation button S1, and a left or right turn indicator button S2, according to standard design.

Figure 2A:
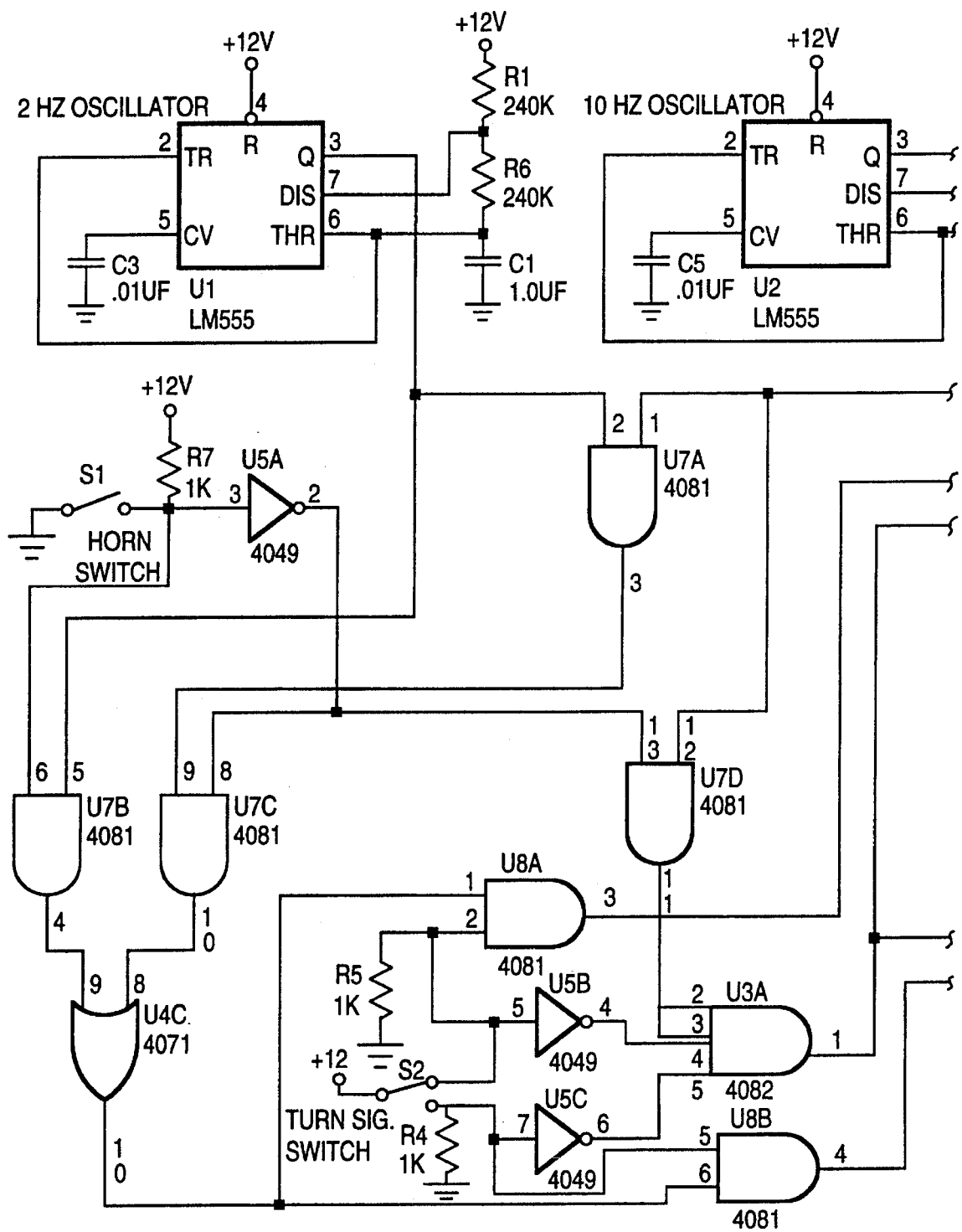
Figure 2B:
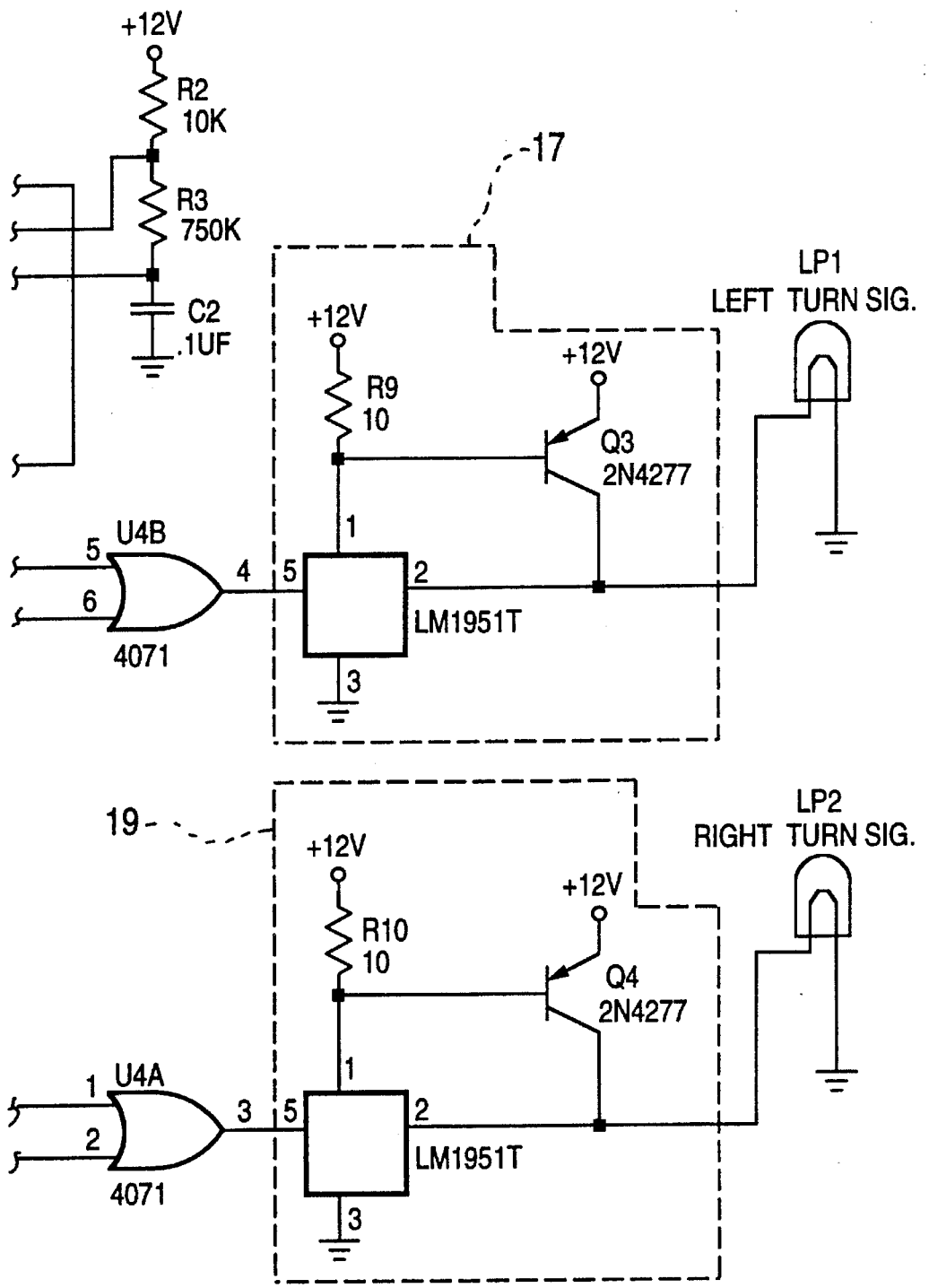

With reference to FIGS. 2A and 2B, the motorcycle signal light emergency circuit is shown according to the preferred embodiment comprised in part of a first 2 Hz astable oscillator U1 having an output Q thereof (pin 3) connected to a first input (pin 2) of a first AND gate U7A, and also connected to a first input (pin 5) of a second AND gate U7B. Resistors R1 and R6 and capacitor C1 are connected to control inputs of the precision timer component of oscillator U1 for setting both the frequency and the duty cycle of the logic signal generated at the Q output of oscillator U1 to approximately 2 Hz and 50% respectively. Likewise shown is a second 10 Hz astable oscillator U2, having resistors R2 and R3 and capacitor C2 connected to control inputs of the precision timer component of oscillator U2, and having an output Q thereof (pin 3) connected to a second input (pin 1) of the first AND gate U7A, and also connected to a first input (pin 12) of a third AND gate U7D. Note that the oscillators U1 and U2 supply output signals, of 2 Hz and 10 Hz respectively, whenever the ignition switch is closed. Capacitors C3 and C5 are decoupling capacitors.

The horn activation switch S1 has one pole connected to ground and has the contact portion connected to a pull-up resistor R7 which is connected to a source of +12 volts. The contact portion is also connected to a second input (pin 6) of the second AND gate U7B, and to the input of a first inverter U5A. The output of the first inverter U5A is connected to a first input (pin 8) of a fourth AND gate U7C, and to a second input (pin 13) of the third AND gate U7D. Since the 2 Hz signal from the first oscillator U1 and the 10 Hz signal from the second oscillator U2 are applied to the two inputs to the first AND gate U7A, the output of the first AND gate U7A is a 10 Hz signal in a 2 Hz envelope, this signal being applied to a second input (pin 9) of the fourth AND gate U7C whenever the ignition switch is in closed position (whenever the motorcycle is in operation).

In normal operation, (i.e. horn activation switch S1 is open), the second input (pin 6) of AND gate U7B receives a logic high voltage signal, and the first input (pin 5) of AND gate U7B receives a 2 Hz logic signal. In that condition, the output of AND gate U7B is a 2 Hz logic signal which is applied to a first input (pin 9) of a first OR gate U4C. Also in that condition, input to the first inverter U5A is a logic high voltage signal. A logic low voltage signal is therefore output from invertor U5A which in turn supplies a logic low voltage signal to the first input (pin 8) of the AND gate U7C to block passage of the 2 Hz bursts of 10 Hz flicker signal via the second input (pin 9) of AND gate U7C through to a second input (pin 8) of the first OR gate U4C.

The output of the OR gate U4C is connected to the first inputs (pins 1 and 6 respectively) of a pair of (fifth and sixth) AND gates U5A and U8B. The centre pole of turn signal switch S2 is connected to a source of +12 volts. The left pole of turn signal switch S2 is connected to the input of a second inverter U5B, and is also connected through a resistor R5 to ground, and is also connected to a second input (pin 2) of the fifth AND gate U5A. The right pole of turn signal switch S2 is connected to the input of a third inverter U5C, and is also connected through a resistor R4 to ground, and is also connected to a second input (pin 5) of the sixth AND gate U8B.

A four input AND gate U3A receives a signal on the first and second inputs (pins 2 and 3) from the output of the third AND gate U7D, a third input (pin 4) being connected to the output of the second inverter U5B, and a fourth input (pin 5) being connected to the output of the third inverter U5C.

The output of AND gate U3A is connected to the first inputs (pins 6 and 1 respectively) of a pair of OR gates U4B and U4A. A second input (pin 5) of OR gate U4B receives the signal output from the AND gate U5A, and a second input (pin 2) of OR gate U4A receives the signal output from the AND gate U8B.

The output of the OR gate U4B is connected to the signal input (pin 5) of a first augmented solid-state switch 17. (The LM1951T solid-state switch is not capable of switching a current of more than one ampere unless augmented as shown with the addition of a germanium transistor Q3, in which case the switching assembly is capable of switching a current of 25 amperes in response to logic high signal input supplied to pin 5 of the LM1951T switch. Switches 17, 19, and 21 are identically configured.) As the augmented solid-state switch 17 closes in response to a logic high voltage input at pin 5, and opens in response to a logic low voltage input at pin 5, the logic input signal (pin 5) effectively gates the +12 volt power output of augmented solid-state switch 17 for illuminating the left turn signal lamp LP1. The lamp LP1 in FIG. 2B actually represents the front and rear left turn indicator lights 3 and 7 as shown in FIG. 1, wired in parallel. The signal light LP1 has been shown to simplify the diagram.

In a similar manner, the output of OR gate U4A is connected to the input (pin 5) of a second augmented solid-state switch 19, the +12 volt power output of which, in turn, is connected to the right turn signal lamp LP2 (which represents the right turn signal indicators 5 and 9 wired in parallel in FIG. 1).

Whenever the ignition switch S3 is closed (i.e. the motorcycle is in operation), oscillator U1 supplies a 2 Hz logic signal to the first input (pin 5) of AND gate U7B and to the first input (pin 2) of AND gate U7A, and oscillator U2 supplies a 10 Hz logic signal to the second input (pin 1) of AND gate U7A and to the first input (pin 12) of the AND gate U7D. Therefore, if ignition switch S3 is closed, AND gate U7A applies an output signal of a 10 Hz oscillation in a 2 Hz envelope to the second input (pin 9) of AND gate U7C.

When the horn switch S1 is open, inverter U5A generates a logic low voltage signal for application to the second input (pin 13) of AND gate U7D. Accordingly, whenever the horn switch S1 is open, AND gate U7D supplies a logic low voltage signal to the first and second inputs (pins 2 and 3) of AND gate U3A, so that the output of AND gate U3A is a logic low voltage signal. Furthermore, when the turn signal switch S2 is open, logic low voltage signals are applied to the second inputs (pins 2 and 5 respectively) of AND gates U8A and U8B rendering their outputs at a logic low voltage. Therefore, when neither of the switches S1 or S2 is closed, neither of the lamps LP1 or LP2 is illuminated.

When horn switch S1 is open the 2 Hz output signal from AND gate U7B passes via the first input (pin 9) of OR gate U4C to the first inputs (pins 1 and 6 respectively) of AND gates U8A and U8B. Therefore, when turn signal switch S2 is closed to the left turn contact (as shown in FIG. 2A, for example) while horn switch S1 is open, the second input (pin 2) of AND gate U8A will receive a logic high voltage signal from the +12 volt power source via the closed turn signal switch S2, and the 2 Hz signal output from AND gate U8A will pass via the second input (pin 5) of OR gate U4B to the augmented solid-state switch 17, which then delivers a 2 Hz power output signal to left turn signal LP1. Likewise, when turn signal switch S2 is closed to the right turn contact while horn switch S1 is open, the second input (pin 5) of AND gate U8B receives a logic high voltage signal from the +12 volt power source via the closed turn signal switch S2, and the 2 Hz signal output of AND gate U8B passes via the second input (pin 2) of OR gate U4A to the augmented solid-state switch 19, which delivers a 2 Hz power output signal to right turn signal LP2.

In the event that the horn switch S1 is closed without closing the turn signal switch S2, inverter U5A outputs a logic high voltage signal which is applied to the second input (pin 13) of AND gate U7D. Accordingly, the 10 Hz signal always present at the first input (pin 12) of AND gate U7D is gated through to the first and second inputs (pins 2 and 3) of AND gate U3A. In addition, when turn signal switch S2 is open, the second and third inverters U5B and U5C generate logic high voltage signals for application to the third and fourth inputs (pins 4 and 5) of AND gate U3A. Therefore, AND gate U3A transmits the input 10 Hz signal (received from AND gate U7D) through to the first inputs (pins 6 and 1 respectively) of OR gates U4B and U4A. The 10 Hz signal outputs from OR gates U4B and U4A activate augmented solid-state switches 17 and 19, thereby flashing both of the turn signal lamps LP1 and LP2 (actually all four turn indicators 3, 5, 7, and 9) at a frequency of 10 Hz simultaneously with the sounding of the horn.

When horn switch S1 is closed while the turn signal switch S2 is closed, inverter U5A outputs a logic high voltage signal which is applied to the first input (pin 8) of AND gate U7C. As the second input (pin 9) of AND gate U7C receives 2 Hz bursts of the 10 Hz signal from AND gate U7A, this signal passes via the second input (pin 8) of OR gate U4C to the first inputs (pins 1 and 6 respectively) of AND gates U8A and U8B. Therefore, when turn signal switch S2 is closed to the left turn contact (as shown in FIG. 2A, for example) while horn switch S1 is closed, the second input (pin 2) of AND gate U8A will receive a logic high voltage signal from the +12 volt power source via the closed turn signal switch S2, and the 2 Hz bursts of 10 Hz signal output from AND gate U8A pass via the second input (pin 5) of OR gate U4B to the augmented solid-state switch 17, which delivers 2 Hz bursts of 10 Hz power output to left turn signal LP1. Likewise, when turn signal switch S2 is closed to the right turn contact while horn switch S1 is closed the second input (pin 5) of AND gate U8B receives a logic high voltage signal from the +12 volt power source via the closed turn signal switch S2, and the 2 Hz bursts of 10 Hz signal output from AND gate U8B pass via the second input (pin 2) of OR gate U4A to the augmented solid state switch 19, which delivers 2 Hz bursts of 10 Hz power output to right turn signal LP2. Note that when both horn switch S1 and turn signal switch S2 are closed, the output of AND gate U3A will be at a logic low voltage, since the inverter on the side to which the turn is being signalled inputs a logic low voltage signal to AND gate U3A.

Figure 3A:
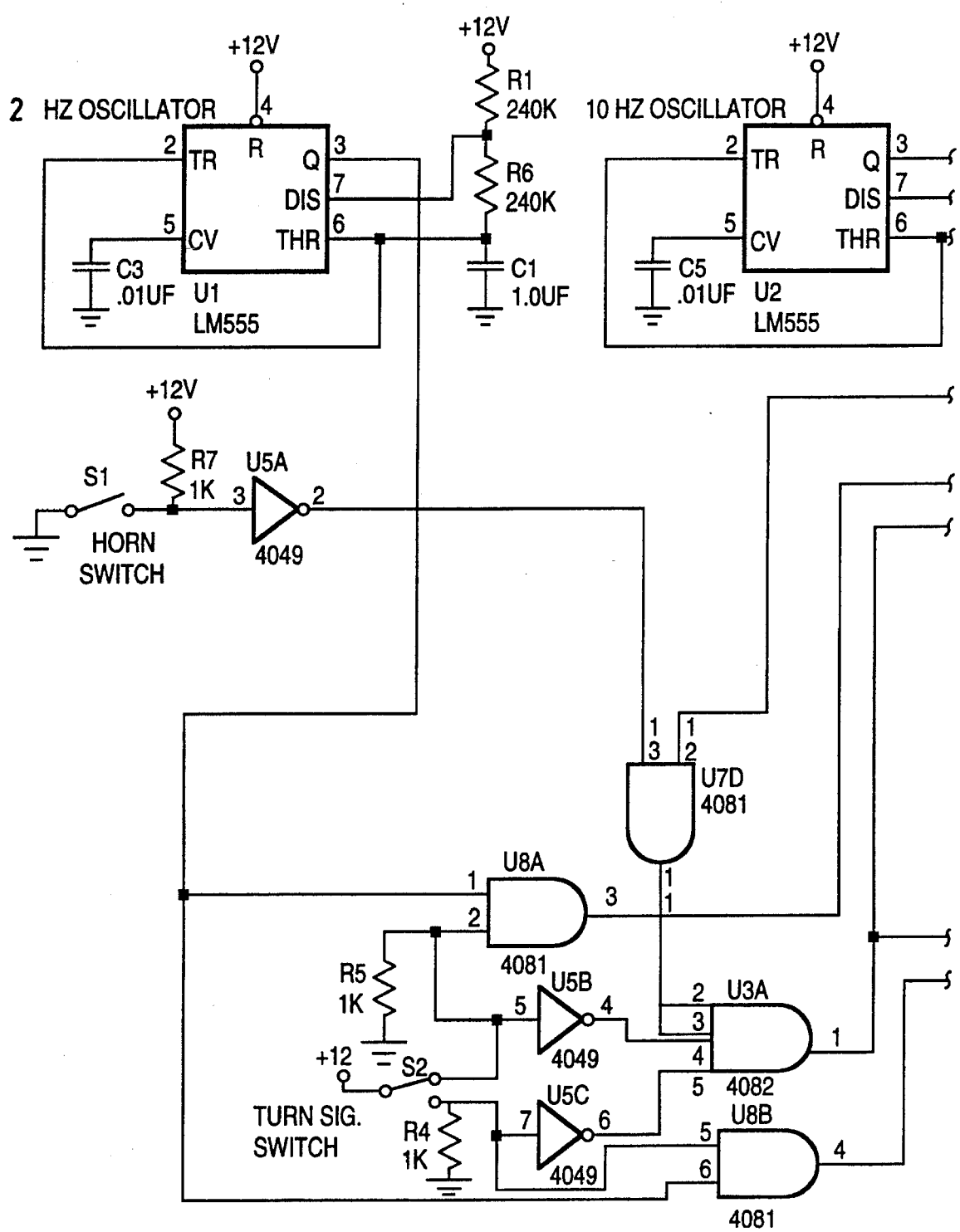
Figure 3B:
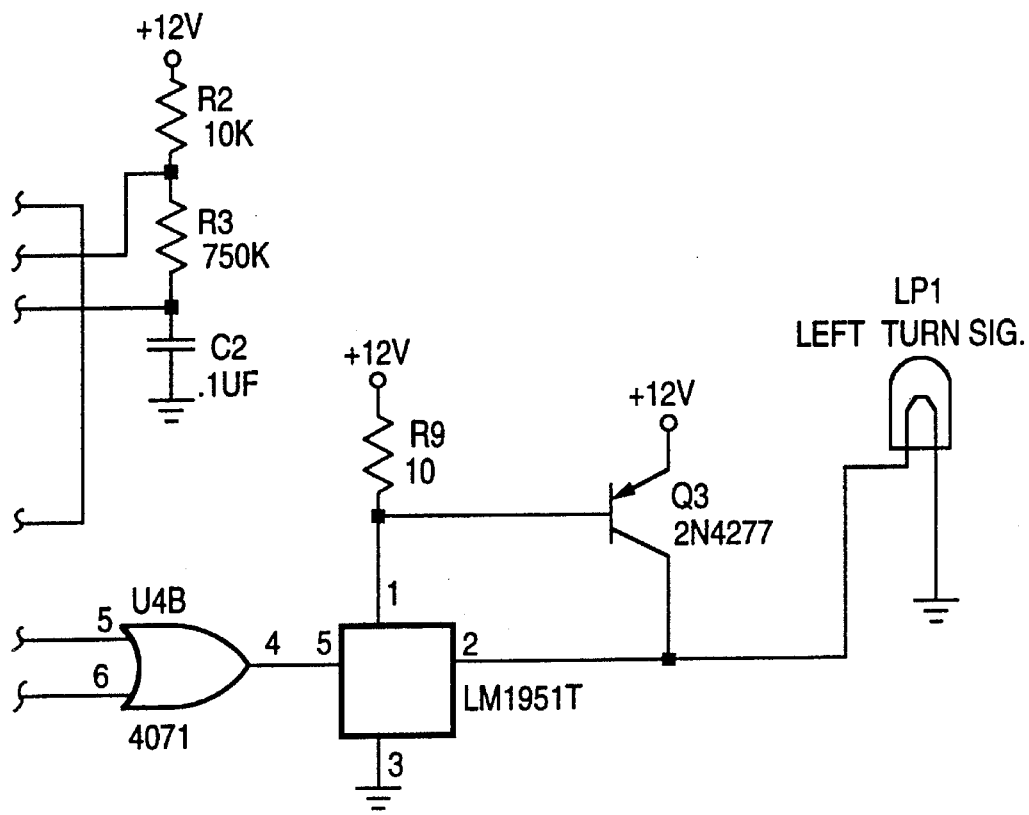
Figure 3B:
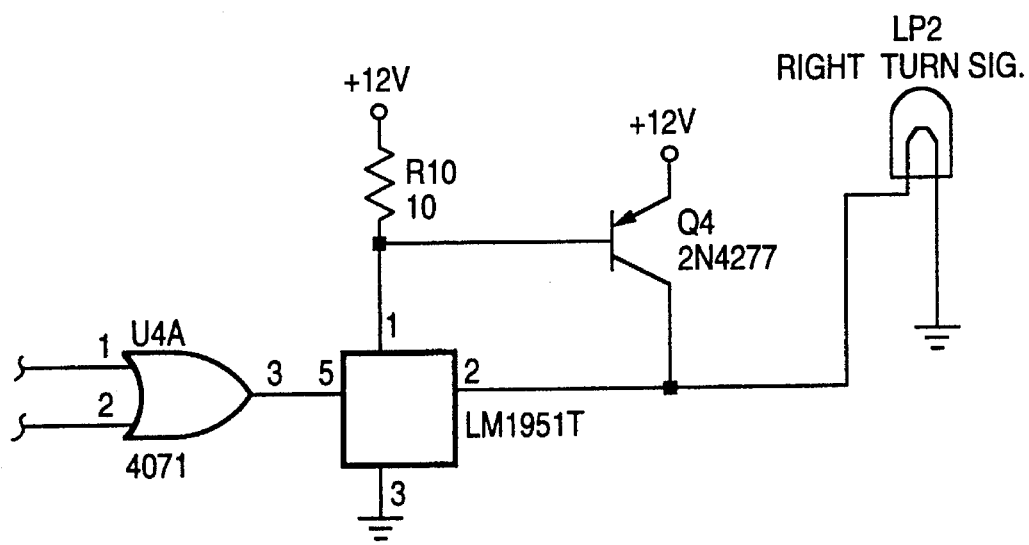

A first alternative embodiment of the motorcycle signal light emergency circuit shown in FIGS. 2A and 2B is shown in FIGS. 3A and 3B. This embodiment has been modified from the preferred embodiment by replacing the components (AND gates U7A, U7B, U7C, and OR gate U4C) that combine the 2 Hz and 10 Hz signals when both horn switch S1 and turn signal switch S2 are closed, with circuitry having turn signalling priority such that when a turn is being signalled, closing the horn switch S1 does not affect turn signal lamps LP1 and LP2. With reference to FIG. 3A and 3B, the circuit is shown according to the alternative embodiment comprised in part of a first 2 Hz astable oscillator U1 having an output Q thereof (pin 3) connected to a first input (pin 1) of a first AND gate U8A, and also connected to a first input (pin 6) of a second AND gate U8B. Resistors R1 and R6 and capacitor C1 are connected to control inputs of the precision timer component of oscillator U1 for setting both the frequency and the duty cycle of the logic signal generated at the Q output of oscillator U1 to approximately 2 Hz and 50% respectively. Likewise shown is a second 10 Hz astable oscillator U2, having resistors R2 and R3 and capacitor C2 connected to control inputs of the precision timer component of oscillator U2, and having an output Q thereof (pin 3) connected to a first input (pin 12) of a third AND gate U7D. Note that the oscillators U1 and U2 supply output signals, of 2 Hz and 10 Hz respectively, whenever the ignition switch is closed. Capacitors C3 and C5 are decoupling capacitors.

The horn activation switch S1 has one pole connected to ground and has the contact portion connected to a pull-up resistor R7 which is connected to a source of +12 volts. The contact portion is also connected to the input of a first inverter U5A. The output of the first inverter U5A is connected to a second input (pin 13) of the first AND gate U7D.

The centre pole of turn signal switch S2 is connected to a source of +12 volts. The left pole of turn signal switch S2 is connected to the input of a second inverter U5B, and is also connected through a resistor R5 to ground, and is also connected to a second input (pin 2) of the second AND gate U8A. The right pole of turn signal switch S2 is connected to the input of a third inverter U5C, and is also connected through a resistor R4 to ground, and is also connected to a second input (pin 5) of the third AND gate U8B.

A four input AND gate U3A receives a signal on the first and second inputs (pins 2 and 3) from the output of the first AND gate U7D, a third input (pin 4) being connected to the output of the second inverter U5B, and a fourth input (pin 5) being connected to the output of the third inverter U5C.

The output of AND gate U3A is connected to the first inputs (pins 6 and 1 respectively) of a pair of OR gates U4B and U4A. A second input (pin 5) of OR gate U4B receives the signal output from the AND gate U8A, and a second input (pin 2) of OR gate U4A receives the signal output from the AND gate U8B.

The output of the OR gate U4B is connected to the signal input (pin 5) of a first augmented solid-state switch 17. As the augmented solid-state switch 17 closes in response to a logic high voltage input at pin 5, and opens in response to a logic low voltage input at pin 5, the logic input signal (pin 5) effectively gates the +12 volt power output of augmented solid-state switch 17 for illuminating the left turn signal lamp LP1. In a similar manner, the output of OR gate U4A is connected to the input (pin 5) of a second augmented solid-state switch 19, the 12 volt power output of which, in turn, is connected to the right turn signal lamp LP2.

Whenever the ignition switch S3 is closed (i.e. the motorcycle is in operation), oscillator U1 supplies a 2 Hz logic signal to the first input (pin 1) of AND gate U8A and to the first input (pin 6) of AND gate U8B, and oscillator U2 supplies a 10 Hz logic signal to the first input (pin 12) of AND gate U7D.

When the horn switch S1 is open, inverter U5A generates a logic low voltage signal for application to the second input (pin 13) of AND gate U7D. Accordingly, whenever the horn switch S1 is open, AND gate U7D supplies a logic low voltage signal to the first and second inputs (pins 2 and 3) of AND gate U3A, so that the output of AND gate U3A is a logic low voltage signal. Furthermore, when the turn signal switch S2 is open, logic low voltage signals are applied to the second inputs (pins 2 and 5 respectively) of AND gates U8A and U8B rendering their outputs logic low voltage. Therefore, when neither of the switches S1 or S2 is closed, neither of the lamps LP1 or LP2 is illuminated. However, when horn switch S1 is closed without closing turn signal switch S2, inverter U5A outputs a logic high voltage signal which is applied to the second input (pin 13) of AND gate U7D. Accordingly, the 10 Hz signal always present at the first input (pin 12) of AND gate U7D is gated through to the first and second inputs (pins 2 and 3) of AND gate U3A. In addition, when turn signal switch S2 is open, the second and third inverters U5B and U5C generate logic high voltage signals for application to the third and fourth inputs (pins 4 and 5) of AND gate U3A. Therefore, AND gate U3A transmits the input 10 Hz signal (received from AND gate U7D) through to the first inputs (pins 6 and i respectively) of OR gates U4B and U4A. The 10 Hz signal outputs from OR gates U4B and U4A activate augmented solid-state switches 17 and 19, thereby flashing both turn signal lamps LP1 and LP2 at a frequency of 10 Hz simultaneously with the sounding of the horn.

When turn signal switch S2 is closed to the left (as shown in FIG. 3A, for example), the second input (pin 2) of AND gate U8A will receive a logic high voltage signal from the +12 volt power source via switch S2, gating the 2 Hz signal output of oscillator U1 through AND gate U8A to the second input (pin 5) of OR gate U4B, and then to the augmented solid-state switch 17, which will deliver a 2 Hz power output to left turn signal LP1. Note also that closing switch S2 to the left causes invertor U5B to output a logic low voltage signal to the third input (pin 4) of AND gate U3A, thereby blocking passage of the 10 Hz signal to the first inputs (pins 6 and 1 respectively) of OR gates U4B and U4A. The left signal lamp LP1 will therefore flash at a rate of 2 Hz, the right lamp LP2 remaining unlit. Closing turn signal switch S2 to the right is in all ways similar and symmetric, in that invertor U5C delivers a logic low voltage signal to the fourth input (pin 5) of AND gate U3A, and the 2 Hz signal from oscillator U1 is gated via AND gate U8B through OR gate U4A to the augmented switch Q4, which powers turn lamp LP2 at 2 Hz, the left lamp LP1 remaining unlit.

Figure 4A:
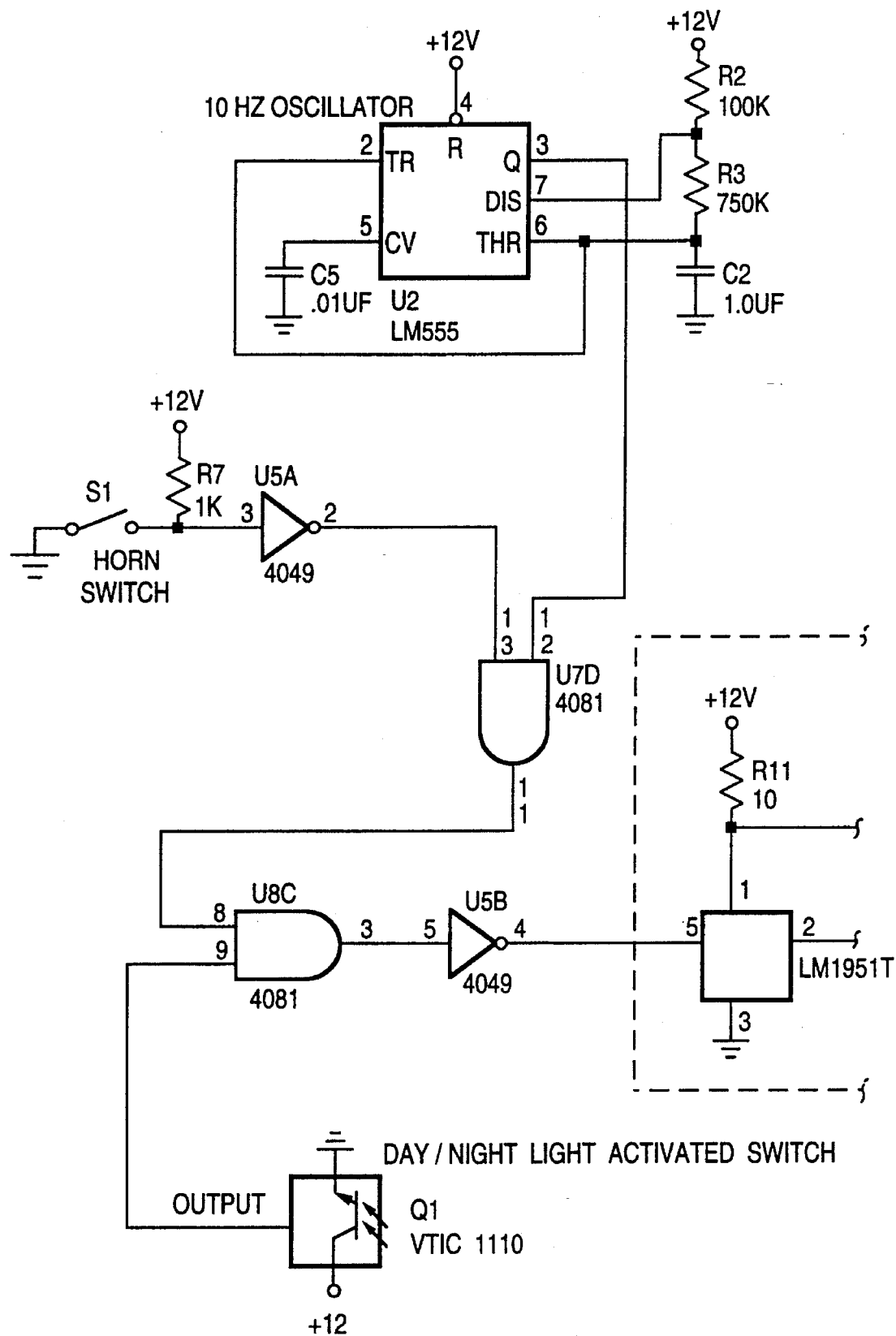
Figure 4B:
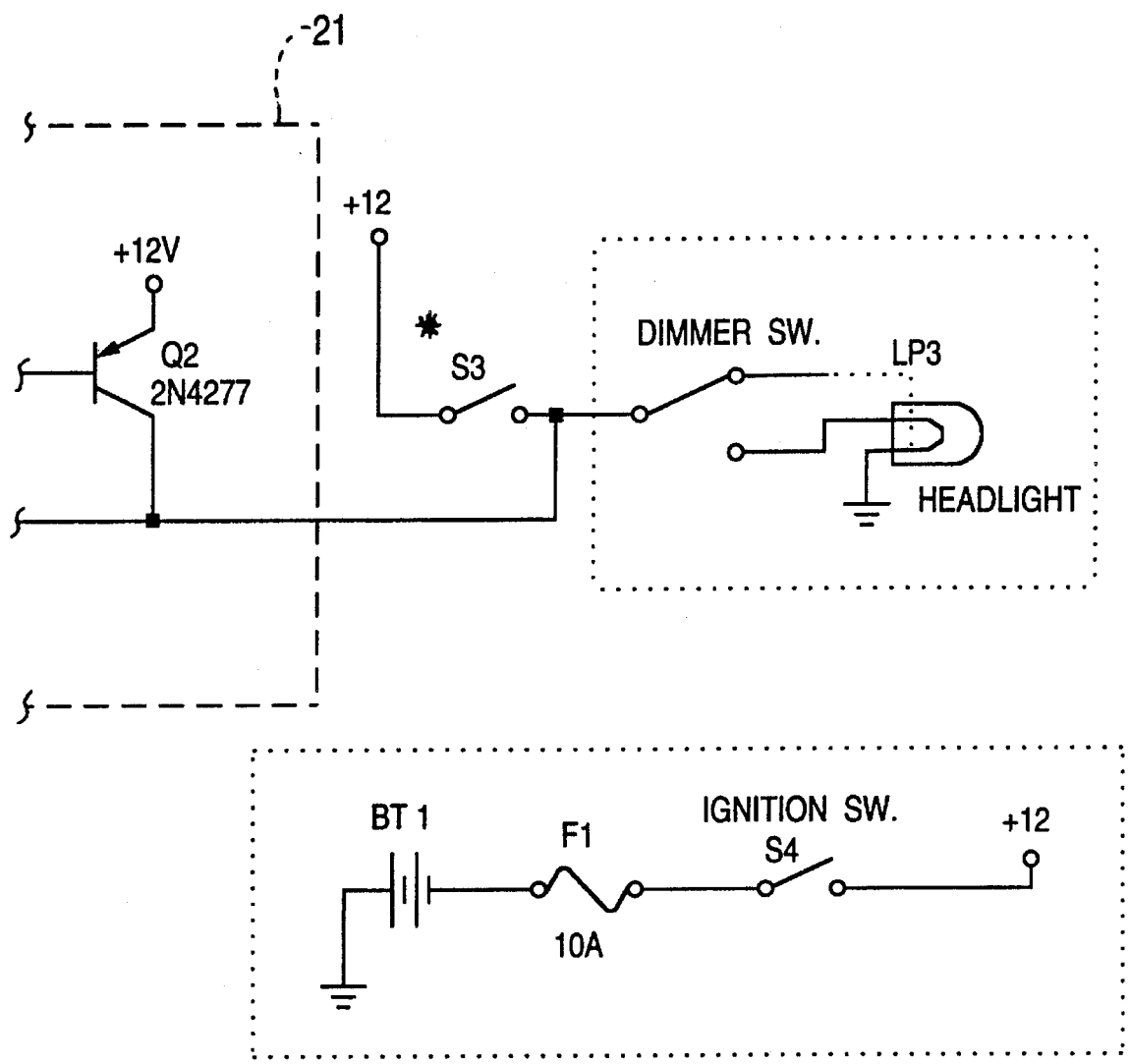

With reference to FIGS. 4A and 4B, a headlight emergency circuit is shown according to a second alternative embodiment comprised in part of a 10 Hz astable oscillator U2 having resistors R2 and R3 and capacitor C2 connected to control inputs of the precision timer component of oscillator U2, and having an output Q thereof (pin 3) connected to a first input (pin 12) of a first AND gate U7D.

The horn activation switch S1 has one pole connected to ground and has the contact portion connected to a pull-up resistor R7 which is connected to a source of +12 volts. The contact portion is also connected to the input of a first inverter U5A. The output of the first inverter U5A is connected to a second input (pin 13) of the first AND gate U7D. When the horn switch S1 is closed the 10 Hz signal output from AND gate U7D is applied to a first input (pin 8) of a second AND gate U8C. When the intensity of the light level is above a fixed threshold (i.e. during daylight hours), the light activated switch Q1 applies a logic high level signal to the second input (pin 9) of AND gate U8C. In daytime therefore, if the horn button S1 is not pressed, input pin 8 receives a logic low voltage input and the AND gate U8C outputs a logic low signal which is inverted to a logic high voltage output by a second inverter U5B, which logic high voltage signal is applied to the input of solid state switch 21, which in response illuminates headlight LP3, Also in daytime, if the horn switch S1 is pressed, AND gate U8C passes the 10 Hz signal input (at pin 8) through to the input of inverter U5B which complements or inverts the 10 Hz signal before application to an augmented solid-state switch 21, which generates a 10 Hz power output corresponding to its 10 Hz signal input, which output is in turn applied to headlight LP3.

When the ambient light level falls below threshold (i.e. at night), the switch Q1 is disabled and a logic low signal is therefore applied to the second input of AND gate U8C. In this condition (nighttime), a logic signal to the first input of AND gate U8C does not affect the logic low output signal from AND gate U8C which is applied to inverter U5B, which in turn applies a logic high output signal to pin 5 of augmented solid-state switch 21, which therefore supplies steady-state power to headlight LP3. Accordingly, the headlight only responds to the 10 Hz signal output from AND gate U8C during daylight hours, and remains in a steady-state ON condition at night without regard to the output of the horn switch S1.

In the event of a failure of the light activated switch Q1, or indeed of any hazard circuit components, switch S3 may be closed so that the headlight has an alternate source of steady-state power from battery BT1, via fuse F1 and ignition switch S4.

Figure 5:
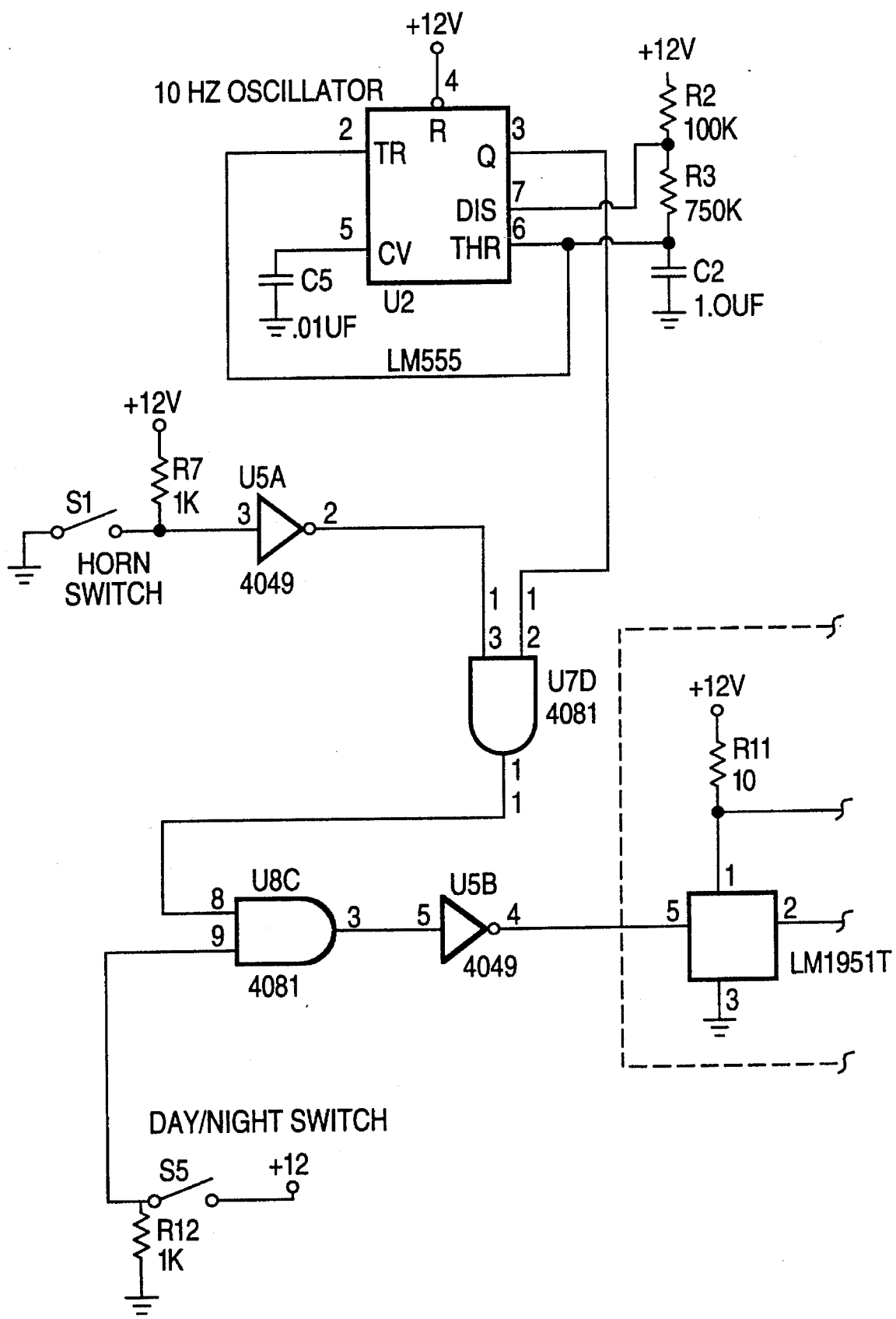

Turning to the third alternative embodiment shown in FIGS. 5 and 4B, in combination, the light activated switch Q1 is replaced by a simple ON/OFF switch S5 connected to ground via resistor R12 and connectible to a source of +12 volts. The circuitry of FIG. 4B operates as discussed above with reference to the second embodiment of FIGS. 4A and 4B. Thus, in the simplified embodiment of FIGS. 5 and 4B, when switch S5 is closed a logic high level signal is applied to the second input (pin 9) of AND gate U8C. If the horn button S1 is not pressed, input pin receives a logic low voltage input and the AND gate U8C outputs a logic low signal which is inverted to a logic high voltage output by inverter U5B, which logic high voltage signal is applied to the input of solid state switch 21, which in response illuminates headlight LP3. If the horn switch S1 is pressed, AND gate U8C passes the 10 Hz signal input (at pin 8) through to the input of inverter U5B which complements or inverts the 10 Hz signal before application to the augmented solid-state switch 21, which generates a 10 Hz power output corresponding to its 10 Hz signal input, which output is in turn applied to headlight LP3.

When switch S5 is open, a logic low signal is applied to the second input of AND gate U8C. In this condition, a logic signal to the first input of AND gate U8C does not affect the logic low output signal from AND gate U8C which is applied to inverter U5B, which in turn applies a logic high output signal to pin 5 of augmented solid-state switch 21, which therefore supplies steady-state power to headlight LP3. Accordingly, the headlight only responds to the 10 Hz signal output from AND gate U8C when switch S5 is closed, and remains in a steady-state ON condition when switch S5 is open, without regard to the output of the horn switch S1.

Figure 6A:
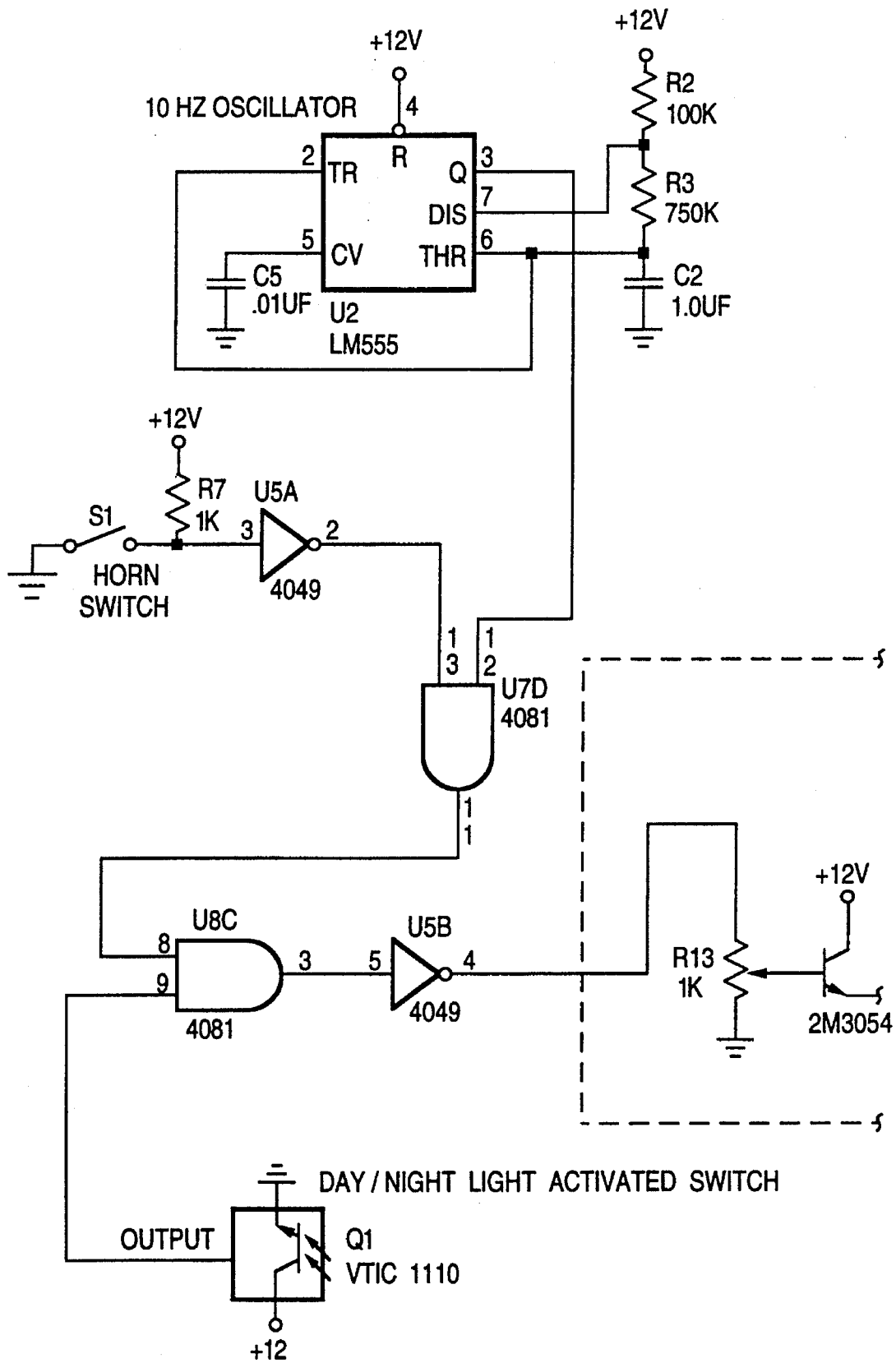
Figure 6B:
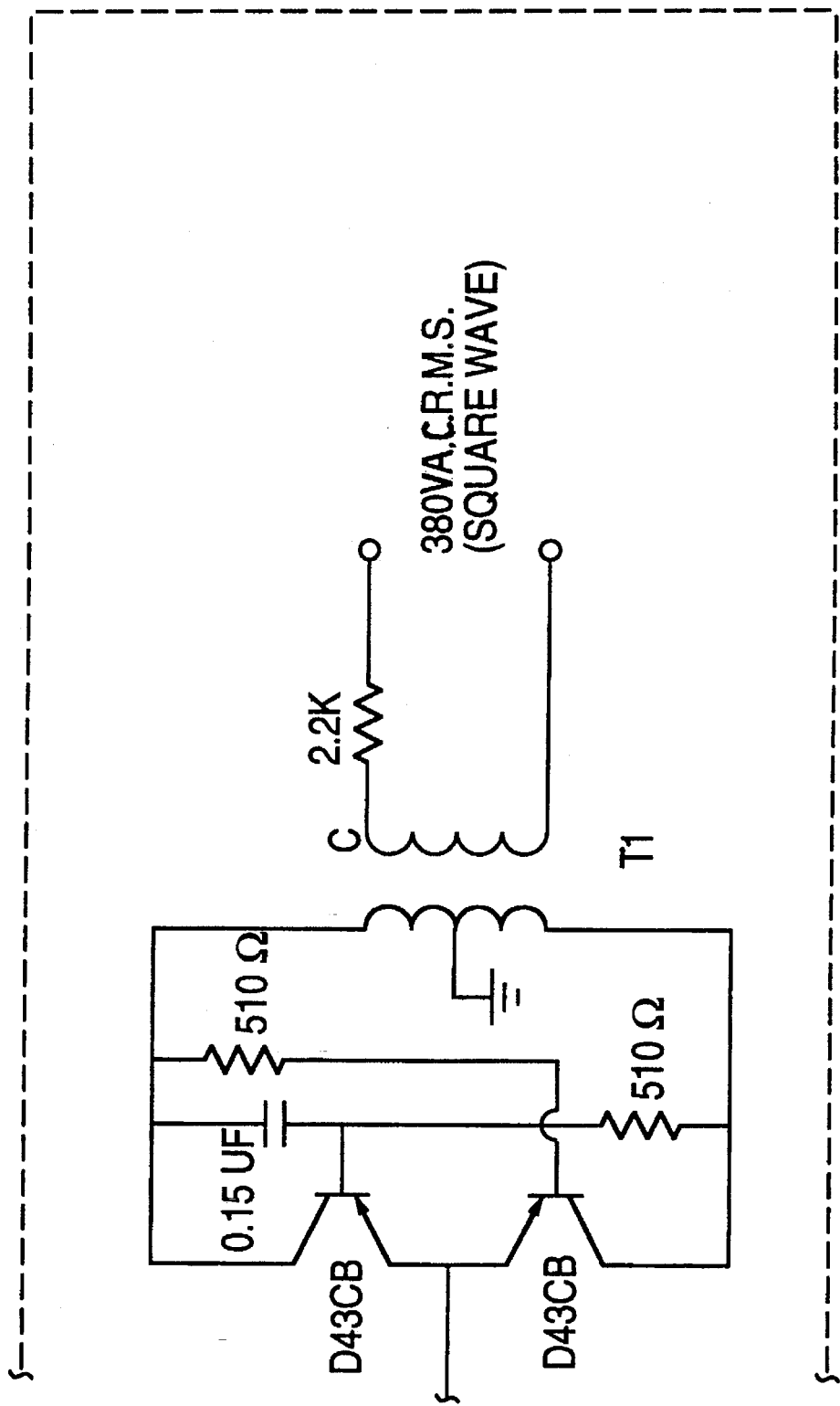

The fourth alternative embodiment is shown in FIGS. 6A and 6B, in which circuitry is provided for driving a light shutter which is placed over the headlight and/or the turn signal lights as an alternative to directly flashing the lights, in the manner shown in FIGS. 7–11. Accordingly, this alternative embodiment may advantageously be implemented as an "add-on" feature to the motorcycle, without extensive rewiring of the flasher circuits.

The circuitry shown outside of the dotted box in FIG. 6A functions in exactly the same manner as the circuitry of FIG. 4A to produce a 10 Hz signal output from AND gate U8C during daylight hours when horn switch S1 is closed, and a steady-state ON signal at night without regard to the state of the horn switch S1. As discussed above with reference to the third alternative embodiment, the DAY/NIGHT activated switch Q1 can be replaced by a simple ON/OFF switch.

The circuitry within the dotted box spanning FIGS. 6A and 6B functions as a driver for the optical shutter depicted in FIGS. 7–11. The shutter may be either electro-optical or mechanical, although according to the best mode of this embodiment, the shutter is a Nematic Curvilinear Aligned Phase (NCAP) device such as is manufactured by Taliq Corp., Mountain View Calif., USA (a subsidiary of Raychem Corporation). A detailed description of the device may be found in an article by J. L. Fergason entitled "Polymer Encapsulated Nematic Liquid Crystals for Display and Light Control Applications", 1985 SID International symposium, Digest of Technical Papers. May 1985, pp. 68–70.

In its basic form, the NCAP device comprises a polymer emulsion of liquid crystal material sandwiched between a pair of transparent electrodes. A pleochroic dye is incorporated into the NCAP device for causing the device to act as a light shutter wherein light transmission is maximized when an electric field is applied across the polymer emulsion bounded by the two transparent electrodes (typically indium tin oxide (ITO) coated onto a transparent material), and wherein light transmission is minimized when the voltage is not applied. Typical switching times are 10 msec on time and <30 msec off time. The shutter can be easily constructed onto any transparent material of arbitrary shape, and can be of arbitrary area. Driving voltage is applied via conductive strips attached to the two electrodes, as discussed in greater detail below with reference to FIGS. 7 and 8. Required current is 20 mA/foot$^2$ @38 VAC R.M.S. (60 Hz square wave) for the shutter produced by Taliq Corp., Mountain View, Calif., U.S.A.

Returning to the circuit of FIGS. 6A and 6B, the driver circuit shown in dashed outline receives a 10 Hz modulation signal and in response generates a modulated 38 VAC R.M.S, 60 Hz square wave drive signal which is applied to the shutter. The circuit operates to convert a 12 V DC signal to the 60 Hz drive signal via a solid state inverter comprising transformer T1 which steps the voltage up to the higher voltage necessary for driving the shutter. More specifically, the transformer T1 is preferably a 70 V audio line transformer in which the primary and secondary sides are reversed, so that it functions as a step-up transformer. Appropriate transformers for this application are the UTAH CV7010 or ALLIED 6W4HFL. The 0.15 uF phase shift capacitor and two 510 ohm biasing resistors set the output frequency at 60 Hz. Thus, in the first half-cycle of oscillation current flows the upper D43C8 transistor to the T1 primary and to ground, and in the remaining half-cycle of oscillation current flows in the opposite direction through the lower D43C8 transistor, to the T1 primary and to ground. The resulting 60 Hz square wave signal is amplified to 38 V by the transformer circuit in response to setting the voltage across biasing resistor R13 to 2.1 V.

The use of an AC shutter drive signal reduces electrode erosion in the shutter device when compared to erosion produced when a DC drive signal is used.

The shutter drive circuit shown in the dotted box can also be applied to the first and second embodiments of the invention. With reference to FIGS. 2A and 3A, an inverter (not shown) may be connected to the output of AND gate U3A, and the driver circuit can then be connected to the output of the inverter, so that the driver effectively controls four shutters (front and rear, left and right turn indicators). Alternatively, an inverter may be connected to the outputs of OR gates U4A and U4B in FIGS. 2B and 3B, so that each drive circuit controls two shutters (front and rear left turn indicator, and front and rear right turn indicator).

Figure 7A:
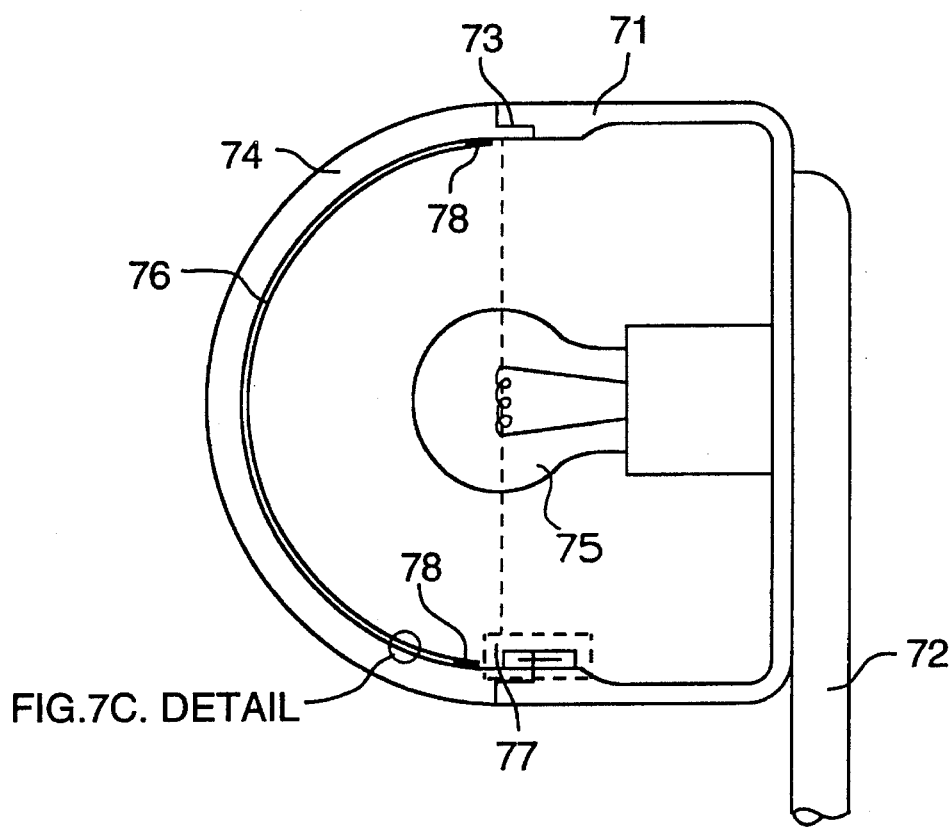
FIGS. 7A and 7B are cross sectional and front views, respectively, of an optical shutter connected to a turn indicator in accordance with the fourth alternative embodiment.
Figures 7B, 7C:
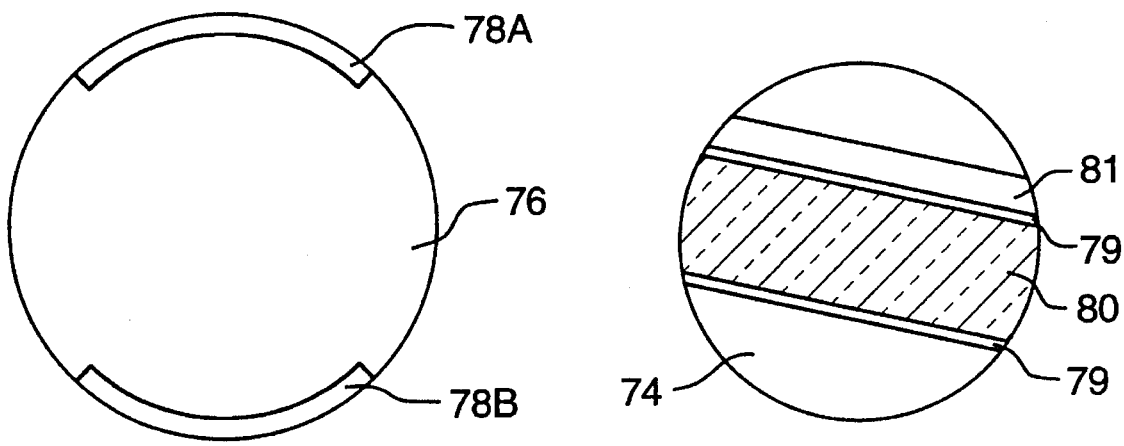
FIG. 7C is a detail cross sectional view of the indicated portion of FIG. 7A.

Turning now to FIGS. 7A, 7B and 7C, a turn indicator for a motorcycle is shown comprising a housing 71 connected to a mount 72 which is attached to the rear portion of the motorcycle. A flange 72 is provided with screws (not shown) for attaching a lens/cover 74. Inside the housing 71 and lens/cover 74, a light bulb 75 is provided. The NCAP shutter 76 is fabricated onto the inner surface of the transparent plastic or glass cover 74 (red or amber) having the contour of a spherical section having its centre at the signal light bulb. The contour of this surface is constrained in that transmission through any point on the shutter 76 is maximal along the path perpendicular to the plane tangent to the shutter at that point.

Figure 9:
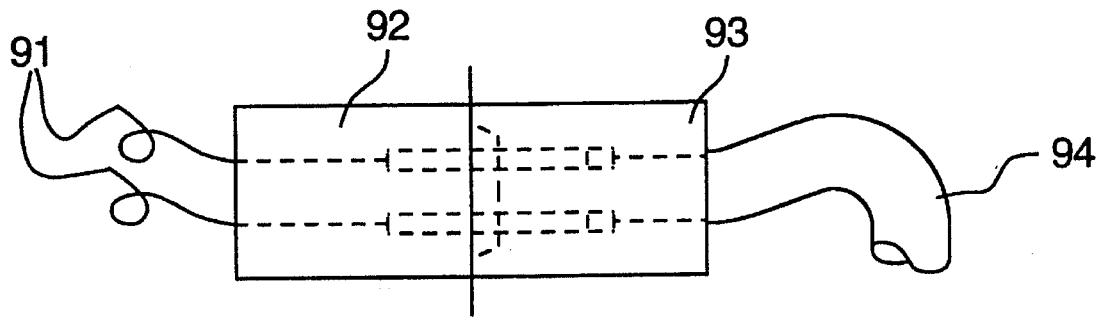
FIG. 9 is a side view of a power plug for the optical shutter in FIGS. 7 and 8.

Power from the shutter driver (FIGS. 6A and 6B) is supplied via a two-pin plug and socket 77 (ie. power plug discussed in greater detail below with reference to FIG. 9), which is situated at the joint between the signal light housing 71 and the signal light cover 74, with the plug being fixed to the inside of the cover and the socket being fixed to the inside of the signal light housing.

An electrical connection is made between the optical shutter 76 and the power plug 77 via conductive strips 78. As shown in FIG. 7B, the conductive strips 78 are connected to a front electrode 78A and rear electrode 78B of the shutter 76.

The input power (female side) is supplied from the signal light shutter driver (FIGS. 6A and 6B), and this power (male side) is applied to the conductive strips 78 attached to the shutter electrodes 78A and 78B. To assemble the housing and cover, the plug pins are aligned with the socket holes before pushing the cover 74 onto the housing flange 73 and tightening the retaining screws.

The NCAP shutter 76 is shown in greater detail with reference to FIG. 7C, and comprises a pair of ITO electrodes 79, a liquid crystal material 80 between the transparent electrodes, and a further polymer film 81 applied to the rear side of the innermost ITO electrode 78. It should be noted that when the shutter 76 is used for flashing a headlight (see description below with reference to FIG. 8), even when the shutter is in the open state transmission is considerably less than 100%. For example, Taliq's standard NACP device is characterized by a transmission range of from 18% transmission in the off state to 64% in the on state. This can be adjusted upwardly by reducing pleochroic dye concentration, but for this polymer and liquid crystal material, maximum transmission is 78% with no incorporated dye. However, closer matching of the index of refraction of the polymer to the 'ordinary' index of refraction of the liquid crystal further increases maximum transmission. To date, the applications developed by Taliq's researchers (moving display billboards, and privacy windows used in house construction) have not required that transmission be maximized. With the consent of the NHTSA, higher-powered headlights could also be permitted, provided that the final output was no more than present permitted values (keeping in mind the glare-reducing properties of the shutter).

Figure 8:
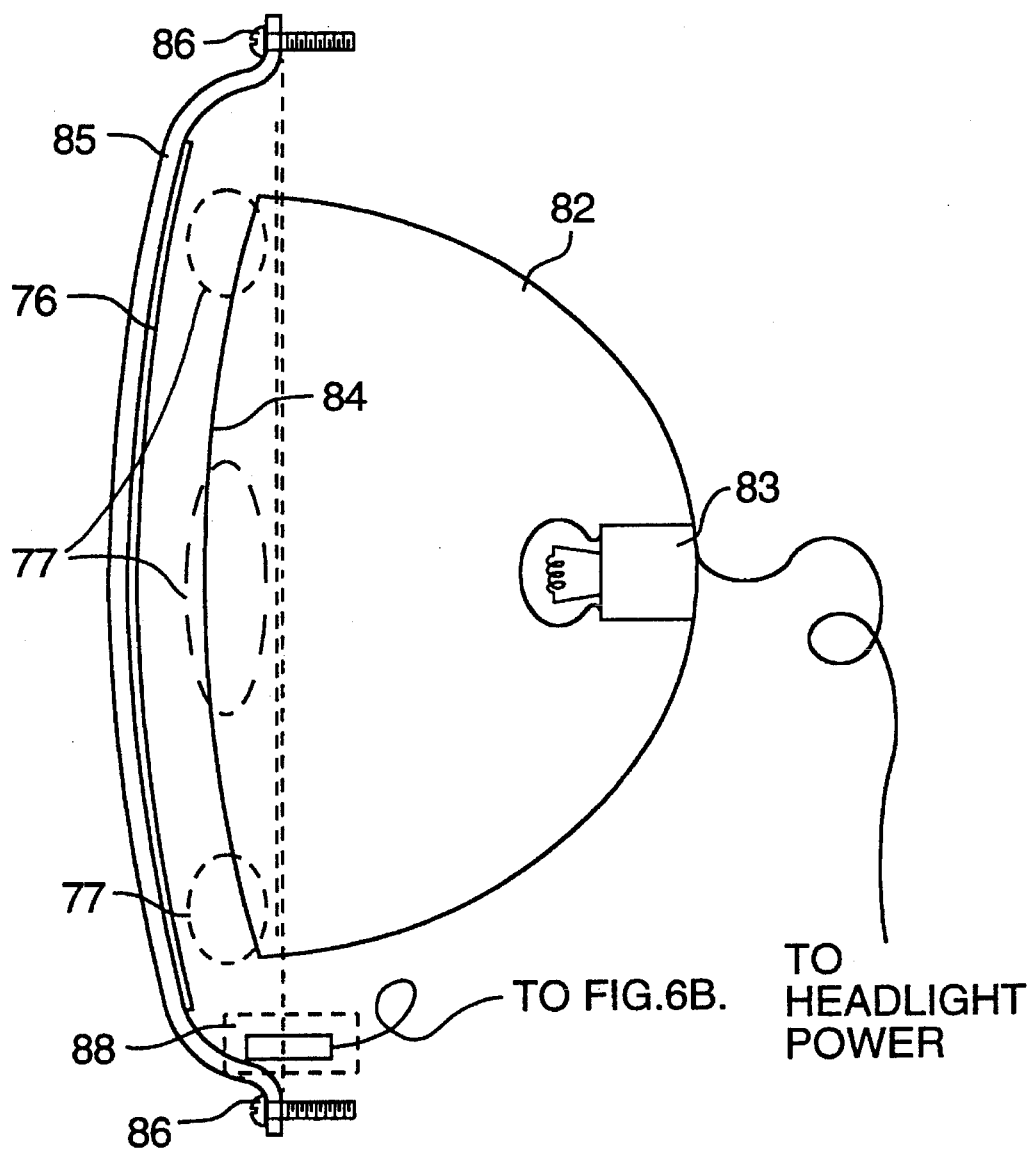
FIG. 8 is a cross sectional view of an optical shutter connected to a headlight in accordance with the fourth alternative embodiment.

In the embodiment of FIG. 8, a motorcycle headlight is shown comprising a reflector 82 embodying a light bulb 83, and a head light lens 84. The NCAP shutter 76 is mounted to an inside surface of transparent cover 85. The structure of NCAP shutter 76 is identical to the structure discussed above with reference to FIGS. 7A–7C. The cover/shutter assembly is mounted to the motorcycle frame via screws 86. The mounting screws are received by the type of fittings typically used to align headlights. Alternatively, mounting tabs (not shown) for the cover 85 could be positioned to align exactly with the mounting tabs (not shown) of the headlight, so that the cover and headlight are mounted and aligned together.

The contour of the inner surface of cover 85 must be designed with careful consideration given to the contour used in the headlight reflector 82. To maximize transmission, the paths of both the direct and reflected light should be perpendicular to the shutter 76 at every point. However, to reduce glare (see discussion below) towards the edge of the shutter 76, transmission of reflected light should be favoured. Unlike conventional parabolic reflectors that reflect light once, new hyperbolic and compound designs reflect the light twice and produce a more highly collimated beam than is produced by parabolic reflector designs. These more modern designs result in much lower frontal surface area (better aerodynamics), and a much deeper reflector. For such headlights, the shutter 76 should have much lower curvature than for parabolic designs.

Power is supplied to the headlight shutter 76 in the headlight embodiment similarly as in the signal light shutter embodiment, except that one of either the plug or socket (power plug 77) is not fixed, but has a short flexible lead, allowing the shutter 76 to be plugged in prior to tightening the mounting screws 86 holding the cover 85 in place. By this arrangement the cover and shutter are aligned to maximize transmission of the light beam and minimize glare without interrupting power to the shutter 76.

An advantageous side effect for headlight shutters is that the shutter 76 attenuates light traversing at other angles, thereby reducing spread of the beam outside the intended path and consequently reducing glare.

As discussed in greater detail below with reference to FIGS. 10 and 11, a plurality of cooling vents 87 are provided in the cover 85.

The top and bottom electrodes of NCAP shutter 76 are connected to a power plug 77. With reference to FIG. 9, the power plug is shown in detail comprising a pair of electrodes 91 for connection to NCAP shutter 76. The plug comprises two interconnecting portions designated as plug side 92 and socket side 93. An insulated wire 94 extends from the socket side 93 to the shutter/driver circuit discussed above with reference to FIG. 6A and 6B.

Figure 10:
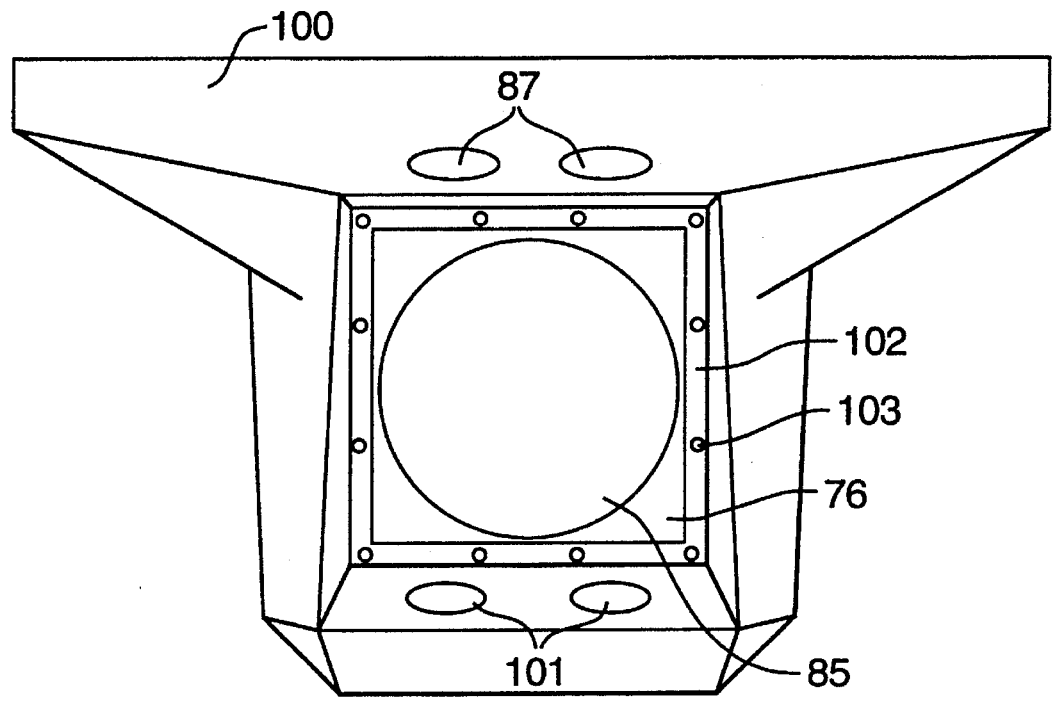
FIG. 10 is a front view of the headlight and optical shutter of FIG. 8 embodied in an ventilated motorcycle fairing.
Figures 11, 12:
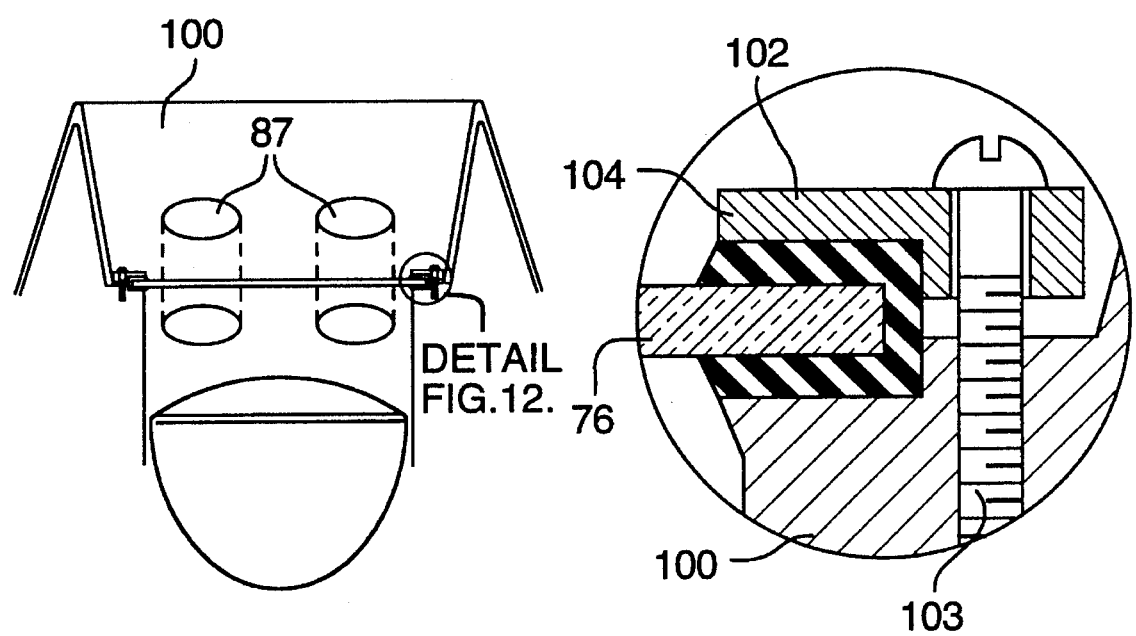
FIG. 11 is a top view of the ventilated fairing of FIG. 10.
FIG. 12 is a detail of a shutter mount for ventilated fairing of FIGS. 10 and 11.

Turning now to FIGS. 10, 11 and 12, an aerodynamic ventilated motorcycle fairing 100 is shown having cooling vents 87 on the top surface and air scoops 101 below the headlight. The shutter 76 is mounted to fairing 100 via a square flange and clamped in place by a square retainer 102 fastened with screws 103. The shutter is oriented perpendicular to, and positioned with its centre at, the line extending from the headlight filament to the aiming pont of the headlight. A rubber cushion 104 insulates the shutter 76 from the retainer 102.

In summary, according to one aspect of the present invention, a motorcycle emergency signal light flasher circuit is provided in which there are four user selectable modes of operation, namely the null mode when neither the horn activation switch nor the turn indicator switch is closed, a signal light flicker at 10 Hz when the horn switch is closed, an appropriate signal light flicker of approximately 2 Hz when the turn indicator switch is closed without the horn switch being closed, and 2 Hz bursts of 10 Hz signal light flicker when the horn switch is closed simultaneously with the turn indicator switch.

Also, according to the first alternative embodiment of the present invention, a motorcycle emergency signal light flasher circuit is provided in which there are three user selectable modes of operation, namely the null mode when neither the horn switch nor a turn indicator switch is closed, a signal light flicker at 10 Hz when the horn switch is closed, and an appropriate signal light flicker of approximately 2 Hz when the turn indicator switch is closed, without regard to the condition of the horn switch.

Also, according to the second alternative embodiment of the present invention, a motorcycle emergency headlight flasher circuit is provided whereby closing the horn switch during daylight hours causes the headlight to flicker at a frequency of 10 Hz, wherein an incorporated photocell prevents the headlight from flickering at night.

Also, according to the third alternative embodiment of the present invention, the circuitry of the second alternative embodiment may be simplified by replacing the photocell with an ON/OFF switch.

Also, according a the-fourth alternative embodiment of the invention, actual flashing of the headlight and turn indicators in the various embodiments may be replaced by one or more optical shutters which can be mounted on the headlight cover, signal light covers, etc. In this embodiment, the lights function in the normal manner, but the transmitted light may be modulated at 10 Hz via the overlying optical shutters.

As discussed above, the inventors have recognized the special significance of 10 Hz signalling flash in motorcycle awareness signalling systems (i.e. the human eye is maximally sensitive to light which is modulated in the vicinity of 10 Hz). Accordingly, it is contemplated that the principles of this invention may also be applied to automobiles or other motorized vehicles.

The illustrated motorcycle signal light flasher circuits of the present invention perform all of the normal functions of a stock flasher assembly found under the side cover of a motorcycle (e.g. Honda 750). Therefore, either of the above signal light embodiments of the present invention can easily be plugged into the socket normally utilized for receiving the stock assembly.

It is anticipated that a gate array logic circuit could be used to carry out the functions of the invertors and other logic circuits utilized in the preferred embodiment. Alternatively, a dedicated microchip can be designed to carry out these functions.

other alternatives and variations are possible without departing from the sphere and scope of the invention as defined by the claims appended hereto.

We claim:

1. An emergency flasher circuit for use with a motorized vehicle having a horn switch and at least one headlight, said emergency flasher circuit comprising:
   a) an optical shutter connected to said at least one headlight;
   b) means for generating a signal having a frequency of approximately 10 Hz;
   c) switching means for generating one of either an enable or disable signal;
   c) logic means connected to said horn switch, said means for generating, and said switching means, for transmitting said signal in the event that said horn switch is closed and said switching means is generating said enable signal; and
   d) a shutter drive circuit connected to said logic means for causing said optical shutter to open and close at said frequency of approximately 10 Hz in response to receiving said signal, thereby causing light generated by said at least one headlight to flash at said frequency of approximately 10 Hz.

2. The emergency flasher of claim 1 wherein said switching means comprises a light activated switch for generating said enable signal in response to being exposed to light levels greater than a predetermined amount and for generating said disable signal in response to being exposed to light levels less than said predetermined amount.

3. The emergency flasher circuit of claim 1 wherein said means for generating comprises an astable oscillator for generating said frequency of approximately 10 Hz.

4. The emergency flasher of claim 3 wherein said circuit means further comprises:
   d) a first invertor having an input and an output, said input being connected to a contact of said horn switch, an opposite pole of said horn switch being connected to ground;
   e) a first AND gate having two inputs and an output, a first one of said inputs being connected to the output of said astable oscillator and a second one of said inputs being connected to the output of said first invertor;
   f) a second AND gate having a pair of inputs and an output, a first input thereof being connected to said switching means, and a second input thereof being connected to the output of said first AND gate; and
   g) a second invertor having an input and an output, said input being connected to the output of said second AND gate and said output being connected to said shutter drive circuit.

5. The emergency flasher of claim 1 wherein said switching means comprises an ON/OFF switch for connection to one of either a source of voltage or to ground for generating said enable signal in response to being connected to said source of voltage and for generating said disable signal in response to being connected to ground.

6. An emergency flasher circuit for use with a motorized vehicle having a horn switch and left and right turn indicator lights selectable by means of a turn indicator switch, said emergency flasher circuit comprising:
   a) means for generating a signal having a frequency of approximately 10 Hz;
   b) optical shutter means connected to said left and right turn indicator lights;
   c) shutter drive circuit means connected to said shutter means; and
   d) logic means connected to said horn switch, said turn signal switch, said shutter drive circuit means and said means for generating, for applying said signal to said shutter drive circuit means in the event said horn switch is closed for causing light generated by said left and right turn indicator lights to flash at said frequency of approximately 10 Hz.

* * * * *